United States Patent
Mori et al.

(10) Patent No.: US 6,748,464 B2
(45) Date of Patent: Jun. 8, 2004

(54) SEMICONDUCTOR DEVICE COMPRISING CPU AND PERIPHERAL CIRCUIT WHEREIN CONTROL UNIT PERFORMS WAIT CYCLE CONTROL THAT MAKES PERIPHERAL CIRCUIT WAIT A PREDETERMINED TIME BEFORE RESPONDING TO CPU

(75) Inventors: Yasufumi Mori, Tokyo (JP); Teruyuki Itou, Tokyo (JP); Yukihiko Shimazu, Toyko (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 457 days.

(21) Appl. No.: 09/774,672

(22) Filed: Feb. 1, 2001

(65) Prior Publication Data

US 2002/0035654 A1 Mar. 21, 2002

(30) Foreign Application Priority Data

Sep. 20, 2000 (JP) ........................... 2000-284546

(51) Int. Cl.$^7$ .................... G06F 11/00; G06F 12/00; G06F 13/00
(52) U.S. Cl. ................. 710/36; 710/8; 710/10; 710/14; 710/16; 710/41; 710/107; 711/141; 711/163; 711/167; 713/401; 713/500; 713/501; 713/600
(58) Field of Search ................ 710/8, 10, 14, 710/16, 36, 41, 107; 711/141, 163, 167; 713/401, 500, 501, 600

(56) References Cited

U.S. PATENT DOCUMENTS 5,070,473 A * 12/1991 Takano et al. ............. 710/260
5,201,036 A * 4/1993 Yoshimatsu ................ 710/107
5,463,756 A * 10/1995 Saito et al. ................. 713/600
5,498,981 A * 3/1996 Fukushige .................. 326/93
5,581,745 A * 12/1996 Muraoka et al. ............ 713/502
5,598,556 A * 1/1997 Ghosh et al. ............... 713/500
5,740,404 A * 4/1998 Baji .......................... 711/167
5,809,517 A * 9/1998 Shimura ..................... 711/115
5,826,092 A * 10/1998 Flannery .................... 713/324
5,854,944 A * 12/1998 Catherwood et al. ........ 710/59
5,956,520 A * 9/1999 Kishi et al. ................. 712/39
6,023,776 A * 2/2000 Ozaki ........................ 714/55
6,067,606 A * 5/2000 Holscher et al. ........... 711/167
6,216,217 B1 * 4/2001 Seki .......................... 712/33
6,226,726 B1 * 5/2001 Kermani et al. ............ 711/170
6,356,987 B1 * 3/2002 Aulas ........................ 711/167
6,378,081 B1 * 4/2002 Hammond .................. 713/501

FOREIGN PATENT DOCUMENTS

| JP | 362229429 | * 10/1987 |
| JP | 402153456 | * 6/1990 |
| JP | 4-332040 | 11/1992 |
| JP | 6-35697 | 2/1994 |
| JP | 6-75765 | 3/1994 |
| JP | 406095873 | * 4/1994 |
| JP | 6-231072 | 8/1994 |
| JP | 6-348581 | 12/1994 |

* cited by examiner

Primary Examiner—Jeffrey Gaffin
Assistant Examiner—Tammara Peyton
(74) Attorney, Agent, or Firm—Leydig, Voit & Mayer, Ltd.

(57) ABSTRACT

A semiconductor device includes a CPU and many peripheral circuits that are accessed by the CPU. Each peripheral circuit includes a wait control register which changeably holds wait cycle number information indicative of the number of wait cycles for an access by the CPU to that peripheral circuit, and a wait control circuit providing wait control for the access by the CPU to that peripheral circuit based on the number of wait cycles held by the wait control register.

12 Claims, 10 Drawing Sheets

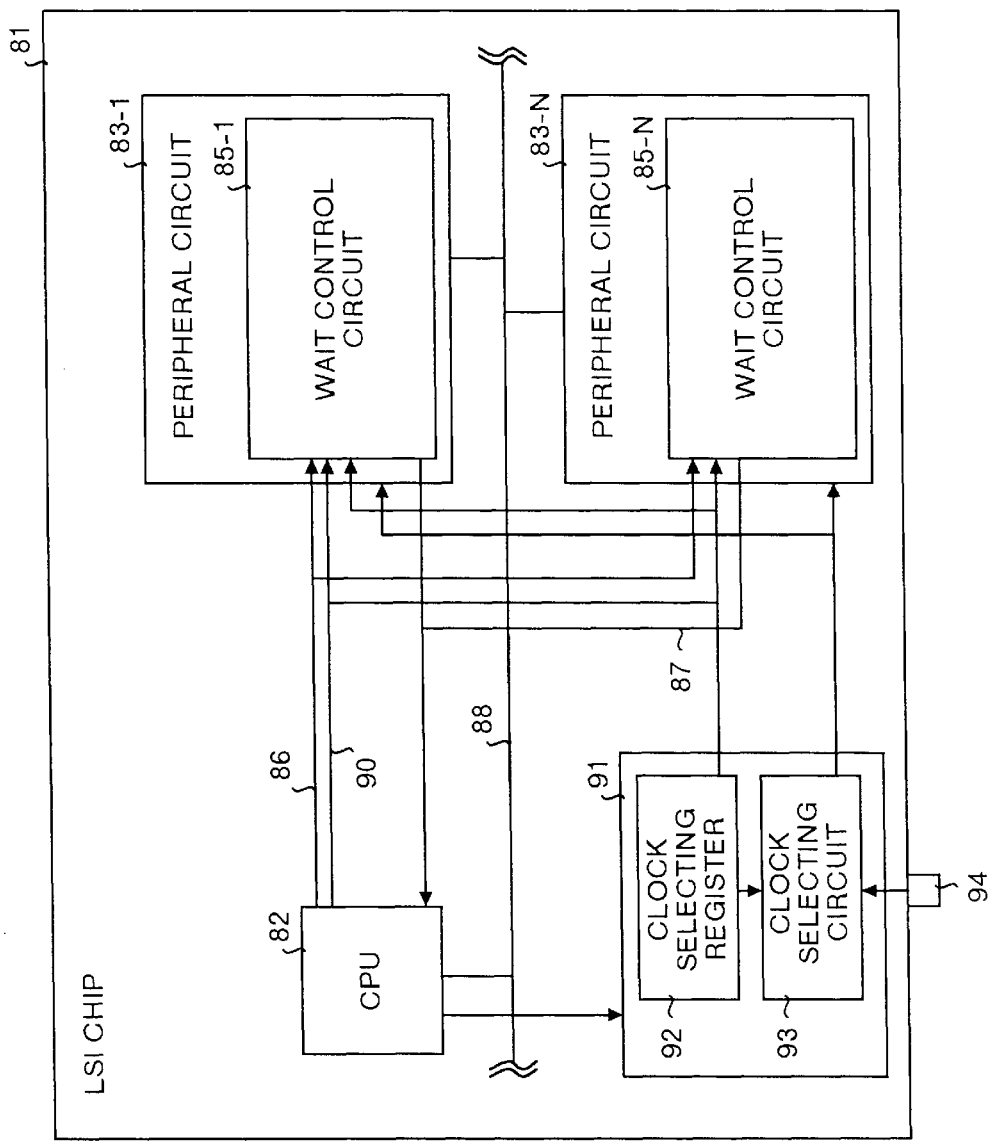

SEMICONDUCTOR DEVICE COMPRISING CPU AND PERIPHERAL CIRCUIT WHEREIN CONTROL UNIT PERFORMS WAIT CYCLE CONTROL THAT MAKES PERIPHERAL CIRCUIT WAIT A PREDETERMINED TIME BEFORE RESPONDING TO CPU

FIELD OF THE INVENTION

The present invention relates to a semiconductor device having therein a CPU and a peripheral circuit that is accessed by the CPU. This invention also relates to a computer-readable recording medium in which is recorded a computer program that, when executed, changes the number of wait cycles for an access to a peripheral circuit by a CPU.

BACKGROUND OF THE INVENTION

In recent years, mobile computers have become widespread. The performance of a semiconductor device including a CPU used in such computers is also increasing. Accordingly, a technique of saving power of such a semiconductor device is demanded. In a conventional semiconductor device, power supply voltage and operation frequency were constant. Power consumption is reduced by utilizing a low power supply voltage and a low operation frequency. The CPU in such conventional semiconductor device is driven by a fixed power supply voltage at a fixed operation frequency and accesses a peripheral circuit in the semiconductor device every fixed number of wait cycles.

When there is a change in the power supply voltage or the operation frequency of a semiconductor device, or the operation frequency for a peripheral circuit, then the number of wait cycles necessary for an access process also changes. If the power supply voltage or operation frequency of the semiconductor device, or the operation frequency for a peripheral circuit changes, such as when these are changed in order to reduce power consumption, the number of wait cycles has to be fixed at a value at which access can be always made within the range of the change.

According to the conventional technique, however, the number of wait cycles for an access to the peripheral circuit in the semiconductor device by the CPU in the semiconductor device is fixed. Consequently, when the power supply voltage or operation frequency of the semiconductor device, or the operation frequency for the peripheral circuit changes, the CPU can not access the peripheral circuit. Resultantly, the semiconductor device cannot perform a proper operation. It is possible to set the number of wait cycles so that the CPU will access the peripheral circuit even if the power supply voltage or operation frequency of the semiconductor device, or operation frequency for a peripheral circuit are changed in a particular range. However, in this case, there is a drawback that the waiting time increases, and the processing capability of the semiconductor device deteriorate.

SUMMARY OF THE INVENTION

It is an object of this invention to obtain a semiconductor device that operates properly and has improved processing capability. Further, is an object of this invention to obtain a computer-readable recording medium in which a computer program which, when executed, changes the number of wait cycles of an access to a peripheral circuit by a CPU is recorded.

In the semiconductor device according to one aspect of the present invention, a holding unit that changeably holds the information of the number of wait cycles; and a control unit that performs the wait control of the access based on the information of the number of wait cycles are provided. Consequently, the number of wait cycles of the access by the CPU to the peripheral circuit can be changed.

In the semiconductor device according to another aspect of the present invention, an input connection unit that supplies a designation signal which designates the number of wait cycles of an access by the CPU to the peripheral circuit from the outside of the semiconductor device to the inside of the semiconductor device; and a control unit that performs the wait control of the access based on the designation signal supplied via the input connection unit are provided. Consequently, the number of wait cycles of the access by the CPU to the peripheral circuit can be changed.

In the semiconductor device according to still another aspect of the present invention, a testing unit that conducts a test for detecting data regarding the number of wait cycles necessary for the access; and a control unit that determines the number of wait cycles of the access by the CPU to the peripheral circuit based on a test result of the testing unit and performs the wait control of the access are provided. Consequently, the number of wait cycles of the access by the CPU to the peripheral circuit can be changed to a proper value.

In the semiconductor device according to still another aspect of the present invention, a power supply voltage detecting unit that detects a power supply voltage of the semiconductor device; and a control unit that determines the number of wait cycles of an access by the CPU to the peripheral circuit based on the detection result of the power supply voltage detecting unit and performs the wait control of the access are provided. Thus, the number of wait cycles of the access by the CPU to the peripheral circuit can be changed according to the power supply voltage of the semiconductor device.

In the semiconductor device according to still another aspect of the present invention, an operation clock detecting unit that detects a frequency of operation clock signal (operation frequency) for operating the semiconductor device; and a control unit that determines the number of wait cycles of an access by the CPU to the peripheral circuit based on a detection result of the operation clock detecting unit and performs the wait control of the access are provided. Consequently, the number of wait cycles of the access by the CPU to the peripheral circuit can be changed according to the operation frequency of the semiconductor device.

In the semiconductor device according to still another aspect of the present invention, a unit for generating an operation clock for a peripheral circuit generates an operation clock signal for a peripheral circuit to operate the peripheral circuit; and a control unit that determines the number of wait cycles of an access by the CPU to the peripheral circuit based on a frequency of the operation clock signal for the peripheral circuit generated by the unit for generating the operation clock signal for the peripheral circuit and performs a wait control of the access are provided. Consequently, the number of wait cycles of the access by the CPU to the peripheral circuit can be changed according to the operation frequency for a peripheral circuit.

A computer program which, when executed, changes the number of wait cycles of an access to a peripheral circuit by a CPU is recorded in the computer-readable recording medium according to still another aspect of the present invention. Consequently, the number of wait cycles of an access by the CPU to a peripheral circuit is changed to a proper value in accordance with the operation frequency of the semiconductor device, the power supply voltage of the semiconductor device, and/or the operation frequency for the peripheral circuit.

Other objects and features of this invention will become apparent from the following description with reference to the accompanying drawings.

BRIEF DESCRIPTION OF THE DRAWINGS

FIG. 10 is a diagram showing a schematic configuration of a semiconductor device according to an eighth embodiment of the invention.

DESCRIPTION OF THE PREFERRED EMBODIMENTS

Preferred embodiments of the present invention are explained in detail below with reference to the attached drawings. However, the present invention is by no means limited only to these embodiments.

Figure 1:
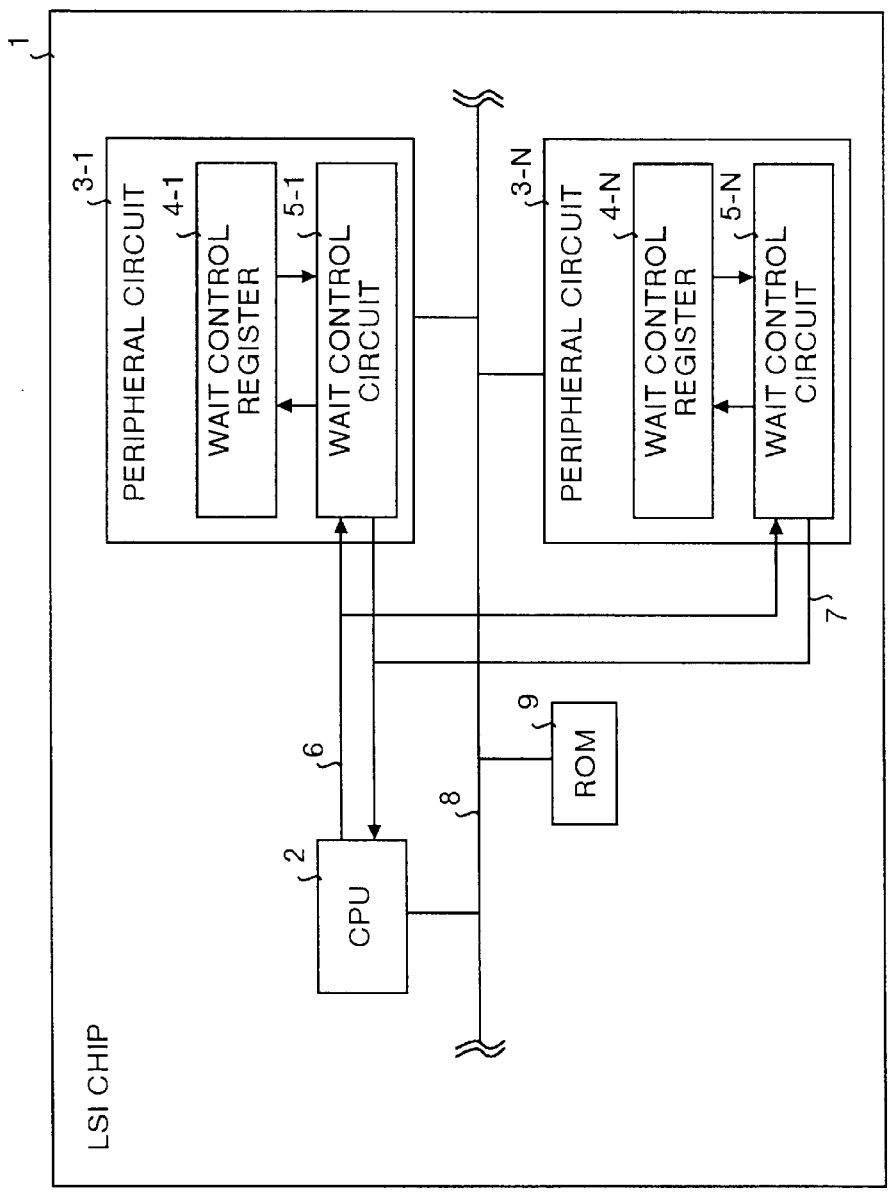
FIG. 1 is a diagram showing a schematic configuration of a semiconductor device according to a first embodiment of the invention.

FIG. 1 is a diagram showing a schematic configuration of a semiconductor device (hereafter, an LSI chip) according to a first embodiment of the present invention. The LSI chip 1 of the first embodiment has a CPU (Central Processing Unit) 2, and peripheral circuits 3-1 to 3-N (N is the number of peripheral circuits) accessed by the CPU 2. A bus request signal line 6 transmits a bus request signal requesting an access to the peripheral circuits 3-1 to 3-N by the CPU 2. A bus completion signal line 7 transmits a bus completion signal notifying of an end of an accessing process. An internal address/data bus 8 connects the CPU 2 and the peripheral circuits 3-1 to 3-N. A ROM (Read Only Memory) 9 stores a program for changing the number of wait cycles of an access.

The peripheral circuits 3-1 to 3-N may be any circuits such as a memory, memory controller, timer, or serial I/O. These peripheral circuits 3-1 to 3-N are mounted on the LSI chip 1 together with the CPU 2. The number of the peripheral circuits 3-1 to 3-N is not especially limited. There may be only one peripheral circuit. Each peripheral circuit has wait control registers 4-1 to 4-N each for changeably holding information of the number of wait cycles of an access (the number of clock cycles in waiting time) from the CPU 2, and wait control circuits 5-1 to 5-N for performing await control of an access to the peripheral circuits 3-1 to 3-N by the CPU 2.

Each wait control register holds the information of the number of wait cycles. The ROM 9 records the program for changing the information of the number of wait cycles in the wait control registers 4-1 to 4-N. By following the program in the ROM 9, the CPU 2 changes the information of the number of wait cycles of each of the wait control registers 4-1 to 4-N in accordance with the power supply voltage of the LSI chip 1, the operation frequency of the LSI chip 1, (the operation frequency for a peripheral circuit in the case of generating an operation clock signal for a peripheral circuit), and temperature.

The CPU 2 transmits the bus request signal to each wait control circuit to access the peripheral circuits 3-1 to 3-N via the internal address/data bus 8. Each wait control circuit counts waiting time of an access based on the information of the number of wait cycles held by the wait control registers 4-1 to 4-N and transmits the bus completion signal to the CPU 2. That is, the access control is performed by the bus request signal and the bus completion signal.

Although it is explained that a separate wait control register is provided in each peripheral circuit, one wait control register may be shared by all or many peripheral circuits. Similarly, one wait control circuit may be shared by all or many peripheral circuits. Although the ROM 9 is shown to be mounted on the LSI chip 1, the ROM 9 may be provided outside of the LSI chip 1. The wait control circuits 5-1 to 5-N correspond to the control unit, the wait control registers 4-1 to 4-N correspond to the holding unit of the invention. The ROM 9 corresponds to the machine-readable recording medium of the invention.

Operations of the first embodiment is explained here. For example, when the CPU 2 accesses the peripheral circuit 3-1, the CPU 2 transmits the bus request signal to the peripheral circuits 3-1 to 3-N, thereby starting an access. Subsequently, the CPU 2 outputs address data to the internal address/data bus 8. In the case of a reading access (access to read data), the CPU 2 prepares to capture data. In the case of a writing access (access to write data), the CPU 2 outputs write data. The peripheral circuits 3-1 to 3-N receive the bus request signal and the address data, and the peripheral circuit 3-1 to be accessed operates. In case of reading access, read data is outputted to the internal address/data bus 8. In case of writing access, write data is captured from the internal address/data bus 8.

The wait control circuit 5-1 in the peripheral circuit 3-1 has a counter (not shown). On receipt of the bus request signal, the wait control circuit 5-1 captures information of the number of wait cycles from the wait control register 4-1, counts the number of clock cycles corresponding to the number of wait cycles and, after finishing the counting, transmits the bus completion signal to the CPU 2. In case of reading access, the CPU 2 which has received the bus completion signal captures data from the internal address/data bus 8, recognizes completion of the access, and shifts to the next access. On the other hand, in case of writing access, the CPU 2 which has received the bus completion signal recognizes the completion of the access, and shifts to the next access.

For example, when it is assumed that the response time of the peripheral circuit 3-1 is 50 nsec and the operation cycle (1/operation frequency) of the LSI chip 1 is 30 nsec, access time of two cycles (60 nsec) is necessary to access the peripheral circuit 3-1, so that one cycle is necessary as the number of wait cycles. When the operation cycle is set to 50 nsec or longer, the necessary access time becomes one cycle and the necessary number of wait cycles becomes zero cycle. In the case where the peripheral circuit 3-1 is a memory, when the power supply voltage supplied to the LSI chip 1 is increased, response time is shortened. The response time of the peripheral circuit 3-1 changes according to temperature as well.

The CPU 2 changes the information of the number of wait cycles of each of the wait control registers 4-1 to 4-N so that the accessing process can be executed efficiently in accordance with the power supply voltage of the LSI chip 1, the operation frequency of the LSI chip 1, (the operation frequency for a peripheral circuit in the case of generating an operation clock signal for the peripheral circuit), and temperature. For example, a table (not shown) showing a correspondence between the power supply voltage of the LSI chip 1, the operation frequency of the LSI chip 1, (the operation frequency for a peripheral circuit in the case of generating an operation clock signal for the peripheral circuit), temperature, and the number of wait cycles is recorded in the ROM 9. The CPU 2 performs the process of changing the number of wait cycles based on the correspondence table.

As described above, according to the first embodiment, each of the wait control registers 4-1 to 4-N changeably holds the information of the number of wait cycles of an access to the peripheral circuits 3-1 to 3-N by the CPU 2, and each of the wait control circuits 5-1 to 5-N executes a wait control of an access based on the information of the number of wait cycles held by each of the wait control registers 4-1 to 4-N. The number of wait cycles of an access to the peripheral circuit 13-1 by the CPU 2 can be thereby changed. Consequently, even when the power supply voltage of the LSI chip 1, the operation frequency of the LSI chip 1, the operation frequency for the peripheral circuit, or the temperature changes, an access can be made efficiently, the LSI chip 1 operates properly, and the processing capabilities can be improved. The invention is particularly suitable for the case of reducing the power consumption by properly changing the power supply voltage of the LSI chip 1 or the operation frequency of the LSI chip 1 (or the operation frequency for a peripheral circuit in the case of generating an operation clock signal for the peripheral circuit).

Figure 2:
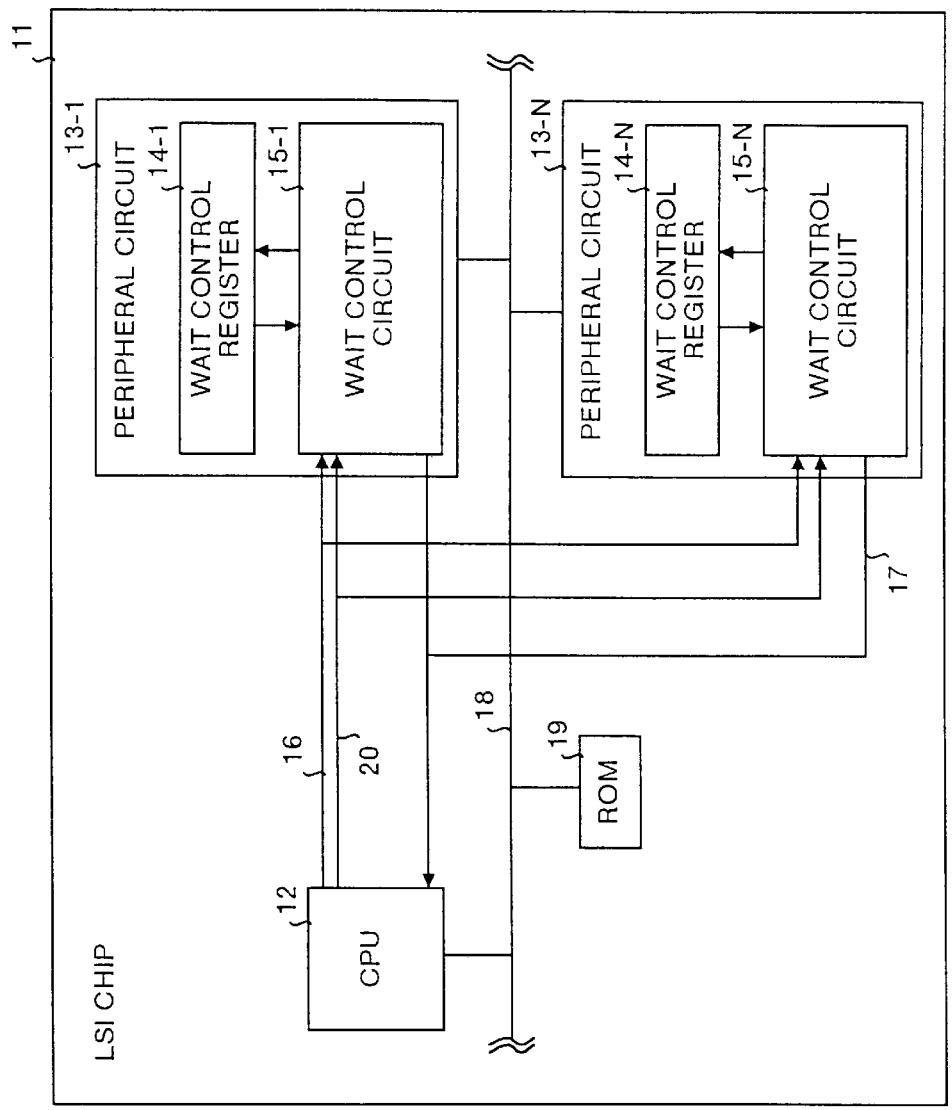
FIG. 2 is a diagram showing a schematic configuration of a semiconductor device according to a second embodiment of the invention.

FIG. 2 is a diagram showing a schematic configuration of an LSI chip according to a second embodiment of the present invention. The LSI chip 11 has a CPU 12, and peripheral circuits 13-1 to 13-N accessed by the CPU 12. A bus request signal line 16 transmits a bus request signal requesting an access by the CPU 12 to the peripheral circuits 13-1 to 13-N. A bus completion signal line 17 transmits a bus completion signal notifying of an end of an accessing process. An internal address/data bus 18 connects the CPU 12 and the peripheral circuits 13-1 to 13-N. A ROM 19 stores a program for changing the number of wait cycles of an access. A read/write signal line 20 transmits a read/write signal indicating whether an access being made is a reading access or a writing access.

The peripheral circuits 13-1 to 13-N may be any circuits such as a memory, memory controller, timer, or serial I/O. These peripheral circuits 13-1 to 13-N are mounted on the LSI chip 11 together with the CPU 12. The number of the peripheral circuits 13-1 to 13-N is not especially limited. There may be only one peripheral circuit. Each peripheral circuit has wait control registers 14-1 to 14-N each for changeably holding information of the number of wait cycles of an access from the CPU 12, and wait control circuits 15-1 to 15-N for performing a wait control of an access by the CPU 12 to the peripheral circuits 13-1 to 13-N based on the information of the number of wait cycles held by the wait control registers 14-1 to 14-N.

Each of the wait control register holds information indicative of the number of wait cycles for a reading access (hereinbelow, called the number of wait cycles for reading) and information indicative of the number of wait cycles for a writing access (hereinbelow, called the number of wait cycles for writing). The ROM 19 records the program for changing the information of the number of wait cycles for reading and the information of the number of wait cycles for writing held in the wait control registers 14-1 to 14-N. By following the program in the ROM 19, the CPU 12 changes the information of the number of wait cycles for reading and the information of the number of wait cycles for writing held in the wait control registers 14-1 to 14-N in accordance with the power supply voltage of the LSI chip 11, the operation frequency of the LSI chip 11, (the operation frequency for a peripheral circuit in the case of generating an operation clock signal for a peripheral circuit), and temperature.

The CPU 12 transmits the bus request signal to each of the wait control circuits 15-1 to 15-N. In case of reading access, the CPU 12 sets a read/write signal to the high level and transmits the signal to the wait control circuits 15-1 to 15-N. In case of writing access, the CPU 12 sets a read/write signal to the low level and transmits the signal to the wait control circuits 15-1 to 15-N. The CPU 12 accesses the peripheral circuits 13-1 to 13-N via the internal address/data bus 18.

In case of reading access, each of the wait control circuits 15-1 to 15-N counts waiting time of an access based on the information of the number of wait cycles for reading held by the wait control registers 14-1 to 14-N and transmits the bus completion signal to the CPU 12. In case of writing access, each of the wait control circuits 15-1 to 15-N counts waiting time of an access based on the information of the number of wait cycles for writing held by the wait control registers 14-1 to 14-N and transmits the bus completion signal to the CPU 12. That is, the number of wait cycles for reading and the number of wait cycles for writing are set independent of each other.

Although it is explained that a separate wait control register is provided in each peripheral circuit, one wait control register may be shared by all or many peripheral circuits. Similarly, one wait control circuit may be shared by all or many peripheral circuits. Although the ROM 19 is shown to be mounted on the LSI chip 11, the ROM 19 may be provided outside of the LSI chip 11. The wait control circuits 15-1 to 15-N correspond to the control unit, the wait control registers 14-1 to 14-N correspond to the holding unit of the invention. The ROM 19 corresponds to the machine-readable recording medium of the invention.

An operation of the second embodiment is explained here. For example, when the CPU 12 accesses the peripheral circuit 13-1, the CPU 12 transmits the bus request signal and the read/write signal to the peripheral circuits 13-1 to 13-N and starts an access. Subsequently, the CPU 12 outputs address data to the internal address/data bus 18. In the case of a reading access, the CPU 12 prepares to capture data. In the case of a writing access, the CPU 12 outputs write data.

The peripheral circuits 13-1 to 13-N receive the bus request-signal, the read/write signal, and the address data.

When the peripheral circuit 13-1 to be accessed operates and the read/write signal is at the high level, that is, in case of reading access, read data is outputted to the internal address/data bus 18. In the case where the read/write signal is at the low level, that is, in case of writing access, write data is captured from the internal address/data bus 18.

The wait control circuit 15-1 in the peripheral circuit 13-1 has a counter (not shown). On receipt of the bus request signal and the read/write signal, the wait control circuit 15-1 determines whether the read/write signal is at the high level or the low level. In case of high level, it is determined as a reading access and information of the number of wait cycles for reading is captured from the wait control register 14-1. On the other hand, if the read/write signal is at the low level, it is determined as a writing access, and the information of the number of wait cycles for writing is captured from the waiting control register 14-1.

That is, the wait control circuit 15-1 captures the information of the number of wait cycles according to the read/write signal, counts clock cycles of the number corresponding to the number of wait cycles and, after the counting, transmits a bus completion signal to the CPU 12. In case of reading access, the CPU 12 which has received the bus completion signal captures data from the internal address/data bus 18, recognizes completion of the access, and shifts to the next access. On the other hand, in case of writing access, the CPU 12 which has received the bus completion signal recognizes the completion of the access and shifts to the next access.

The response time in the reading access and that in the writing access of each of the peripheral circuits 13-1 to 13-N may be different from each other. For example, when a write buffer is provided, the response time in writing is largely shortened. Assuming now that the response time in the reading access of the peripheral circuit 13-1 is 60 nsec, the response time in the writing access is 20 nsec, and the operation cycle of the LSI chip 11 is 25 nsec, access time of three cycles is necessary for the reading access, so that two wait cycles is needed. On the other hand, access time of one cycle is necessary for the writing access, so that zero wait cycle is required.

The information of the number of wait cycles of each of the wait control registers 14-1 to 14-N is divided into information of the number of wait cycles for reading and information of the number of wait cycles for writing which can be separately set. By setting the information of the number of wait cycles for reading and that for writing different from each other in such a manner that the number of wait cycles for reading is set to two and that for writing is set to zero, an access can be efficiently made.

The CPU 12 changes the information of the number of wait cycles for reading and that for writing of each of the wait control registers 14-1 to 14-N so that the bus completion signal is transmitted during the clock cycle period in which the operation of each of the peripheral circuits 13-1 to 13-N is completed, in accordance with the power supply voltage of the LSI chip 11, the operation frequency of the LSI chip 11, (the operation frequency for a peripheral circuit in the case of generating an operation clock signal for the peripheral circuit), and temperature. The information of the number of wait cycles for reading and that for writing can be changed independent of each other.

For example, a correspondence table (not shown) of the power supply voltage of the LSI chip 11, the operation frequency of the LSI chip 11, (the operation frequency for a peripheral circuit in the case of generating an operation clock signal for the peripheral circuit), temperature, the number of wait cycles for reading, and the number of wait cycles for writing is recorded in the ROM 19. The CPU 12 performs the process of changing the number of wait cycles for reading and that for writing based on the correspondence table.

As described above, according to the second embodiment, in addition to effects similar to those of the first embodiment, each of the wait control registers 14-1 to 14-N changeably holds the information of the number of wait cycles for writing and that for reading. Each of the wait control circuits 15-1 to 15-N executes a wait control of a writing access based on the information of the number of wait cycles for writing held by each of the wait control registers 14-1 to 14-N, and executes a wait control for a reading access based on the information of the number of wait cycles for reading held by each of the wait control registers 14-1 to 14-N. Consequently, the wait control for the writing access and that for the reading access can be performed separately. Thus, the processing capabilities can be further improved.

Figure 3:
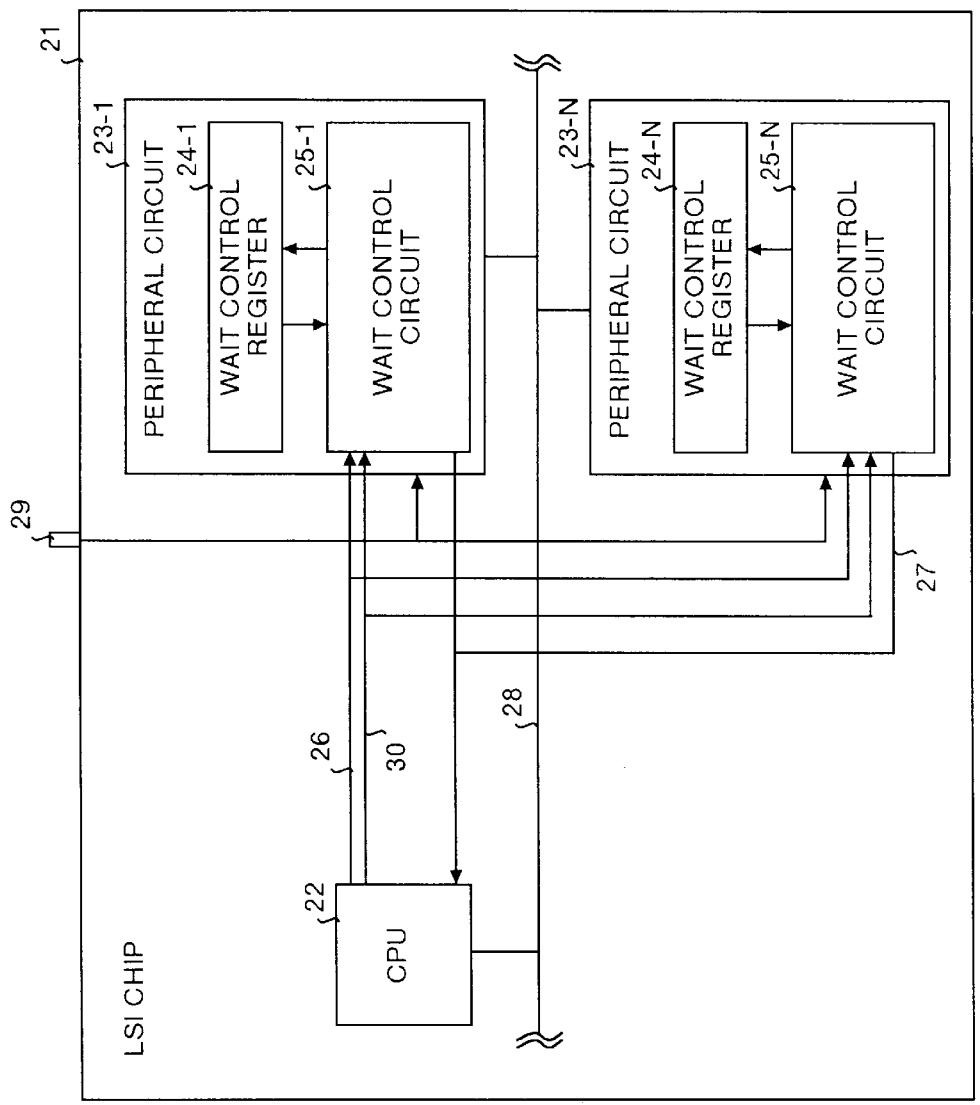
FIG. 3 is a diagram showing a schematic configuration of a semiconductor device according to a third embodiment of the invention.

FIG. 3 is a diagram showing a schematic configuration of an LSI chip according to a third embodiment of the present invention. The LSI chip 21 has a CPU 22, and peripheral circuits 23-1 to 23-N accessed by the CPU 22. A bus request signal line 26 transmits a bus request signal requesting an access by the CPU 22 to the peripheral circuits 23-1 to 23-N. A bus completion signal line 27 transmits a bus completion signal notifying of an end of an accessing process. An internal address/data bus 28 connects the CPU 22 and the peripheral circuits 23-1 to 23-N. A wait control signal input terminal 29 receives, from outside, a wait control signal for controlling the number of wait cycles of an access by the CPU 22 to each of the peripheral circuits 23-1 to 23-N. A read/write signal line 30 transmits a read/write signal indicating whether an access being made is a reading access or a writing access.

The peripheral circuits 23-1 to 23-N may be any circuits such as a memory, memory controller, timer, or serial I/O. These peripheral circuits 23-1 to 23-N are mounted on the LSI chip 21 together with the CPU 22. The number of the peripheral circuits 23-1 to 23-N is not especially limited. There may be only one peripheral circuit. Each peripheral circuit has wait control registers 25-1 to 25-N for performing a wait control of an access by the CPU 22 to the peripheral circuits 23-1 to 23-N based on the wait control information supplied via the wait control signal input terminal 29.

The CPU 22 transmits the bus request signal to each of the wait control circuits 25-1 to 25-N. In case of reading access, the CPU 22 sets a read/write signal to the high level and transmits the signal to the wait control circuits 25-1 to 25-N. In case of writing access, the CPU 22 sets a read/write signal to the low level and transmits the signal to the wait control circuits 25-1 to 25-N. The CPU 22 accesses the peripheral circuits 23-1 to 23-N via the internal address/data bus 28.

A wait control signal generating device (not shown) on the outside of the LSI chip 21 transmits a wait control signal for designating the number of wait cycles for reading and the number of wait cycles for writing according to the power supply voltage of the LSI chip 21, the operation frequency of the LSI chip 21, (the operation frequency for a peripheral circuit in the case of generating an operation clock signal for the peripheral circuit), and temperature to the wait control circuits 25-1 to 25-N via the wait control signal input terminal 29. The wait control signal is switched in a state where an access by the CPU 22 to the peripheral circuits 23-1 to 23-N is not being made or during a reset period of the LSI chip 21.

The wait control signal generating device (not shown) on the outside of the LSI chip 21 has a ROM in which a program for switching the wait control signal is recorded, switches a wait control signal in accordance with the program recorded on the ROM, and outputs a wait control signal. Each of the wait control circuits 25-1 to 25-N executes a wait control in accordance with the number of wait cycles for reading or the number of wait cycles for writing designated by the received wait control signal. Specifically, in case of reading access, each of the wait control circuits 25-1 to 25-N counts waiting time of an access based on the number of wait cycles for reading designated by the received wait control signal, and transmits the bus completion signal to the CPU 22.

In case of writing access, each of the wait control circuits 25-1 to 25-N counts waiting time of an access based on the number of wait cycles for writing designated by the wait control signal received, and transmits the bus completion signal to the CPU 22. Alternately, the following manner is also possible. The wait control registers 24-1 to 24-N for holding the information of the number of wait cycles for reading and the information of the number of wait cycles for writing are provided for the peripheral circuits 23-1 to 23-N, respectively. The wait control signal generating device (not shown) on the outside of the LSI chip 21 rewrites the number of wait cycles for reading and the number of wait cycles for writing held by the wait control registers 24-1 to 24-N in accordance with the power supply voltage of the LSI chip 21, the operation frequency of the LSI chip 21, (the operation frequency for a peripheral circuit in the case of generating an operation clock signal for the peripheral circuit), and temperature.

In this case, at the time of a reading access, each of the wait control circuits 25-1 to 25-N counts waiting time of an access based on the information of the number of wait cycles for reading held by the wait control registers 24-1 to 24-N, and transmits the bus completion signal to the CPU 22. At the time of a writing access, each of the wait control circuits 25-1 to 25-N counts waiting time of an access based on the number of wait cycles for writing held by the wait control registers 24-1 to 24-N and transmits the bus completion signal to the CPU 22.

Although it is explained that a separate wait control register is provided in each peripheral circuit, one wait control register may be shared by all or many peripheral circuits. Similarly, one wait control circuit may be shared by all or many peripheral circuits. The wait control circuits 25-1 to 25-N correspond to the control unit, the wait control signal input terminal 29 corresponds to the input connection unit of the invention. The ROM in the wait control signal generating device (not shown) corresponds to the machine-readable recording medium of the invention.

An operation of the third embodiment is explained here. For example, when the CPU 22 accesses the peripheral circuit 23-1, the CPU 22 transmits the bus request signal and the read/write signal to the peripheral circuits 23-1 to 23-N, thereby starting an access. Subsequently, the CPU 22 outputs address data to the internal address/data bus 28. In the case of a reading access, the CPU 22 prepares to capture data. In the case of a writing access, the CPU 22 outputs write data.

The peripheral circuits 23-1 to 23-N receive the bus request signal, the read/write signal, and the address data. When the peripheral circuit 23-1 to be accessed operates and the read/write signal is at the high level, that is, in case of reading access, read data is outputted to the internal address/data bus 28. In the case where the read/write signal is at the low level, that is, in case of writing access, write data is captured from the internal address/data bus 28.

The wait control circuit 25-1 in the peripheral circuit 23-1 has a counter (not shown). On receipt of the bus request signal and the read/write signal, the wait control circuit 25-1 determines whether the read/write signal is at the high level or the low level. In case of high level, it is determined as the reading access and information of the number of wait cycles for reading designated by the wait control signal from the wait control signal input terminal 29 is captured. On the other hand, in case of low level, it is determined as a writing access and information of the number of wait cycles for writing designated by the wait control signal from the wait control signal input terminal 29 is captured.

That is, the information of the number of wait cycles according to the read/write signal is captured. Clock cycles of the number corresponding to the number of wait cycles are counted and, after the counting, a bus completion signal is transmitted to the CPU 22. In case of reading access, the CPU 22 which has received the bus completion signal captures data from the internal address/data bus 28, recognizes completion of the access, and shifts to the next access. On the other hand, in case of writing access, the CPU 22 which has received the bus completion signal recognizes the completion of the access, and shifts to the next access.

As described above, according to the third embodiment, the wait control signal for controlling the number of wait cycles of an access by the CPU 22 to the peripheral circuits 23-1 to 23-N is supplied from the outside of the LSI chip 21 via the wait control signal input terminal 29. Each of the wait control circuits 25-1 to 25-N executes the wait control of the access based on the wait control signal supplied via the wait control signal input terminal 29. The number of wait cycles of the access by the CPU 22 to the peripheral circuits 23-1 to 23-N can be thereby changed. Even when the power supply voltage of the LSI chip 21, the operation frequency of the LSI chip 21, the operation frequency for a peripheral circuit, or the temperature changes, therefore, the access can be efficiently made, the semiconductor device can operate properly, and the processing capabilities can be improved.

Fourth Embodiment

Figure 4:
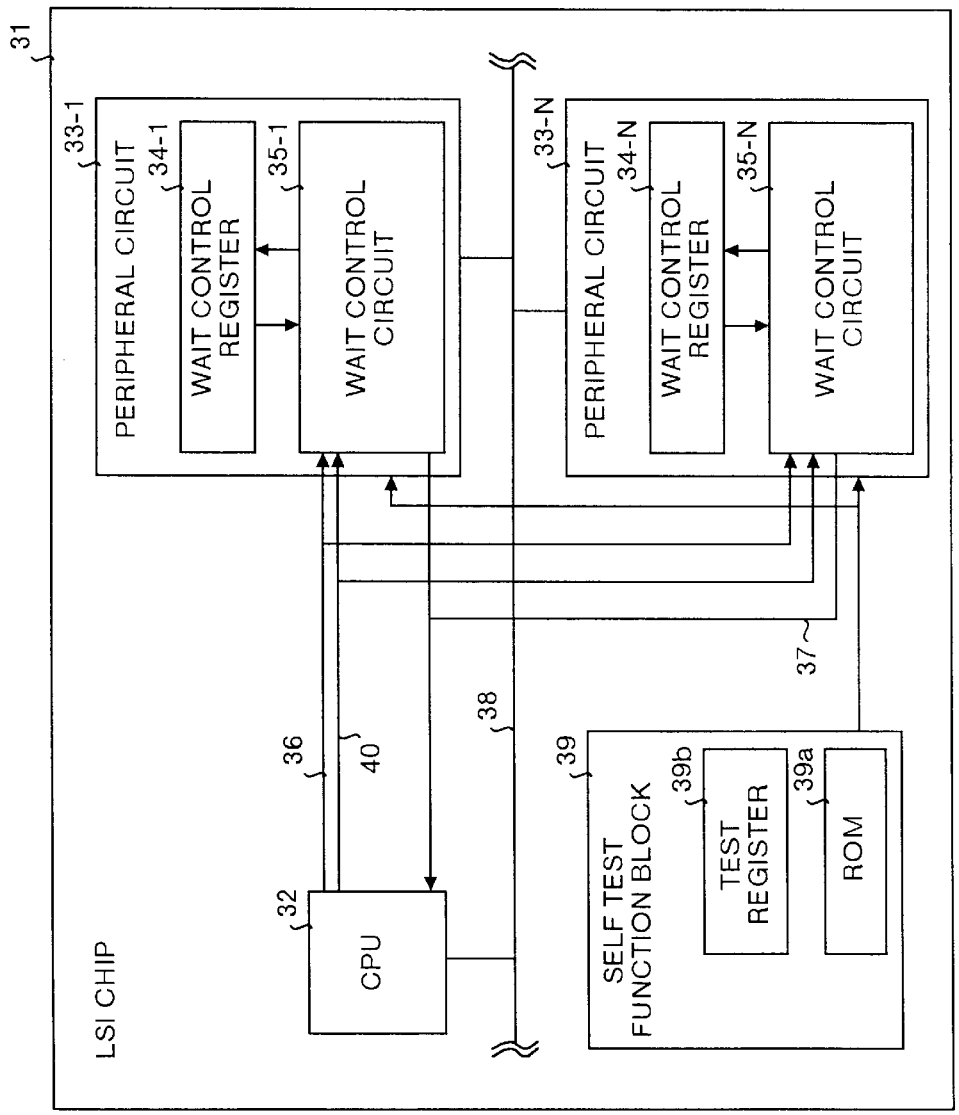
FIG. 4 is a diagram showing a schematic configuration of a semiconductor device according to a fourth embodiment of the invention.

FIG. 4 is a diagram showing a schematic configuration of an LSI chip according to a fourth embodiment of the present invention. The LSI chip 31 has a CPU 32, and peripheral circuits 33-1 to 33-N accessed by the CPU 32. A bus request signal line 36 transmits a bus request signal requesting an access by the CPU 32 to the peripheral circuits 33-1 to 33-N. A bus completion signal line 37 transmits a bus completion signal notifying of an end of an accessing process. An internal address/data bus 38 connects the CPU 32 and the peripheral circuits 33-1 to 33-N. A self test function block 39 conducts a self test to detect the number of wait cycles necessary for the access by the CPU 32 to each of the peripheral circuits 33-1 to 33-N. A read/write signal line 40 transmits a read/write signal indicating whether the access being made is a reading access or a writing access.

The peripheral circuits 33-1 to 33-N may be any circuits such as a memory, memory controller, timer, or serial I/O. These peripheral circuits 33-1 to 33-N are mounted on the LSI chip 31 together with the CPU 32. The number of the peripheral circuits 33-1 to 33-N is not especially limited. There may be only one peripheral circuit. Each peripheral circuit has wait control registers 34-1 to 34-N for changeably holding information of the number of wait cycles of the access from the CPU 32, and wait control circuits 35-1 to 35-N for performing a wait control of an access by the CPU 32 to the peripheral circuits 33-1 to 33-N based on the information of the number of wait cycles held by the wait control registers 34-1 to 34-N.

The self test function block 39 comprises a ROM 39a that stores a computer program for allowing a test to be conducted and allowing information of the number of wait cycles according to the test result to be written into the wait control registers 34-1 to 34-N, and a test register 39b used for the test. Response time of the test register 39b is set to the same value as the response time of the peripheral circuits 33-1 to 33-N. A test register may be provided corresponding to each peripheral circuit.

The self test function block 39 conducts an access test to the test register 39b in accordance with the program on the ROM 39a and writes information of the number of wait cycles according to the test result into the wait control registers 34-1 to 34-N. The following manner is also possible. The wait control registers 34-1 to 34-N are not provided, and the wait control circuits 35-1 to 35-N receive the test result of the self test function block 39 and perform a wait control in accordance with the test result. The testing process is performed during the reset period of the LSI chip 31.

By conducting the test, the proper number of wait cycles which changes according to the power supply voltage of the LSI chip 31, the operation frequency of the LSI chip 31, (the operation frequency for a peripheral circuit in the case of generating an operation clock signal for the peripheral circuit), or the temperature can be obtained. The CPU 32 transmits the bus request signal to each of the wait control circuits 35-1 to 35-N. In case of reading access, the CPU 32 sets a read/write signal to the high level and transmits the signal to the wait control circuits 35-1 to 35-N. In case of writing access, the CPU 32 sets a read/write signal to the low level and transmits the signal to the wait control circuits 35-1 to 35-N. The CPU 32 accesses the peripheral circuits 33-1 to 33-N via the internal address/data bus 38.

In case of reading access, each of the wait control circuits 35-1 to 35-N counts waiting time of an access based on the information of the number of wait cycles for reading held by the wait control registers 34-1 to 34-N and transmits the bus completion signal to the CPU 32. In case of writing access, each of the wait control circuits 35-1 to 35-N counts waiting time of an access based on the information of the number of wait cycles for writing held by the wait control registers 34-1 to 34-N and transmits the bus completion signal to the CPU 32. That is, the number of wait cycles for reading and the number of wait cycles for writing can be set independent of each other.

Although it is explained that a separate wait control register is provided in each peripheral circuit, one wait control register may be shared by all or many peripheral circuits. Similarly, one wait control circuit may be shared by all or many peripheral circuits. The wait control circuits 35-1 to 35-N correspond to the control unit, the self test function block 39 corresponds to the testing unit of the invention. The ROM 39a corresponds to the machine-readable recording medium of the invention.

Figure 5:
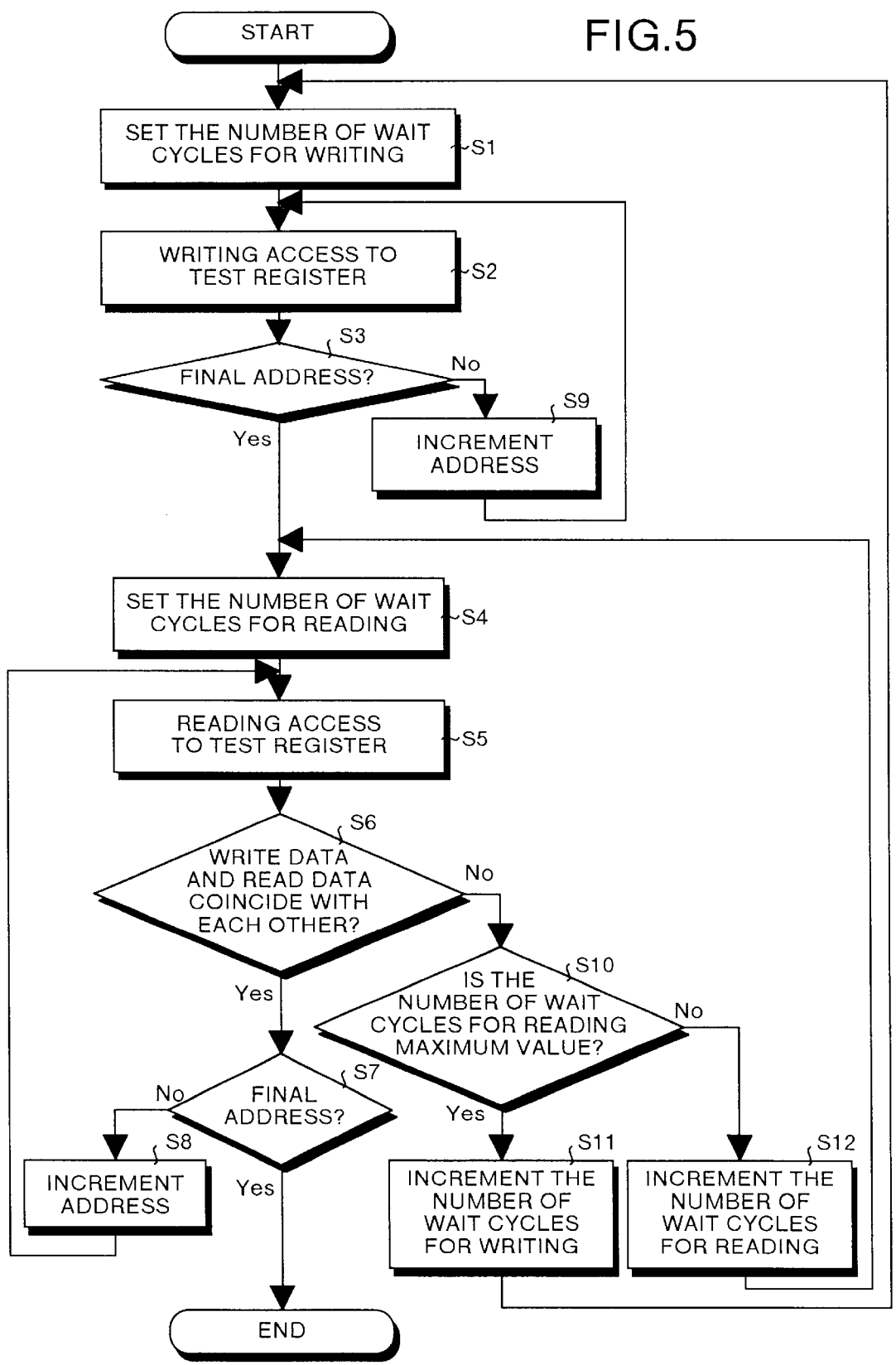
FIG. 5 is a flowchart of a testing operation according to the fourth embodiment.

An operations of the fourth embodiment is explained here. FIG. 5 is a flowchart of a testing operation of the self test function block 39 according to the fourth embodiment. In the test operation, first, the self test function block 39 sets a predetermined initial value (minimum value) as the number of wait cycles for writing to the test register 39b (step S1). Subsequently, a write access to the test register 39b is made. Predetermined data is sequentially written from the head address to the final address of the test register 39b (steps S3, S9, and S2).

When the write access to the final address is finished (YES in step S3), the self test function block 39 sets a predetermined initial value (minimum value) as the number of wait cycles for reading to the test register 39b (step S4). A read access of sequentially reading data from the head address of the test register 39b is made (step S5). Whether the read data and the data written in step S2 coincides with each other or not is determined (step S6). When the read data and the data written in step S2 coincides with each other, whether the read address is the final address or not is determined. When the read address is the final address, the process is finished. When the read address is not the final address, the read address is incremented and the program returns to step S5.

When the read data and the data written in step S2 does not coincide with each other in step S6, whether the set value of the number of wait cycles for reading access to the test register 39b is a predetermined maximum value or not is determined (step S10). When the set value of the number of wait cycles for reading access to the test register 39b is not the maximum value, the set value of the number of wait cycles for reading access to the test register 39b is incremented (step S12) and the program returns to the step S4. On the other hand, when the set value of the number of wait cycles for the reading access to the test register 39b is the predetermined maximum value, it is determined that the write access has failed. The set value of the number of wait cycles for writing access to the test register 39b is incremented (step S11) and the program returns to step S1.

After the testing operation is finished, the self test function block 39 writes the set value of the number of wait cycles of the read access to the test register 39b and the set value of the number of wait cycles of the write access to the test register 39b into the wait control registers 34-1 to 34-N. When the response time of the test register 39b is different from that of the peripheral circuits 33-1 to 33N, the number of wait cycles for reading and the number of wait cycles for writing the peripheral circuits 33-1 to 33-N are calculated from the set value of the number of wait cycles of the reading access and the set value of the number of wait cycles of the writing access to the test register 39b and are written into the wait control registers 34-1 to 34-N. The testing operation is performed, for example, during the reset period of the LSI chip 31.

An operation of accessing the peripheral circuits 33-1 to 33-N by the CPU 32 will now be described. For example, when the CPU 32 accesses the peripheral circuit 33-1, the CPU 32 transmits the bus request signal and the read/write signal to the peripheral circuits 33-1 to 33-N, thereby starting an access. Subsequently, the CPU 32 outputs address data to the internal address/data bus 38. In the case of a reading access, the CPU 32 prepares to capture data. In the case of a writing access, the CPU 32 outputs write data.

The peripheral circuits 33-1 to 33-N receive the bus request signal, the read/write signal, and the address data. When the peripheral circuit 33-1 to be accessed operates and the read/write signal is at the high level, that is, in case of reading access, read data is outputted to the internal address/databus 38. In the case where the read/write signal is at the low level, that is, in case of writing access, write data is captured from the internal address/data bus 38.

The wait control circuit 35-1 in the peripheral circuit 33-1 has a counter (not shown). On receipt of the bus request signal and the read/write signal, the wait control circuit 35-1 determines whether the read/write signal is at the high level or the low level. When the read/write signal is at the high level, it is determined as a reading access and information of the number of wait cycles for reading is captured from the wait control register 34-1. On the other hand, when the read/write signal is at the low level, it is determined as a writing access, and information of the number of the wait cycles for writing is captured from the wait control register 34-1.

That is, the information of the number of wait cycles according to the read/write signal is captured. Clock cycles of the number corresponding to the number of wait cycles are counted and, after the counting, a bus completion signal is transmitted to the CPU 32. In case of reading access, the CPU 32 which has received the bus completion signal captures data from the internal address/data bus 38, recognizes completion of the access, and shifts to the next access. On the other hand, in case of writing access, the CPU 32 which has received the bus completion signal recognizes the completion of the access and shifts to the next access.

As described above, according to the fourth embodiment, the self test function block 39 accesses the test register 39b. Whether the access has succeeded or not is determined, and the number of wait cycles necessary for the access to the test register 39b is obtained as a test result. The number of wait cycles of an access by the CPU 32 to the peripheral circuits 33-1 to 33-N can be changed to a proper value. Consequently, even when the power supply voltage of the LSI chip 31, the operation frequency of the LSI chip 31, the operation frequency for a peripheral circuit, or the temperature changes, an access can be efficiently made, the semiconductor properly operates, and the processing capabilities can be improved.

Figure 6:
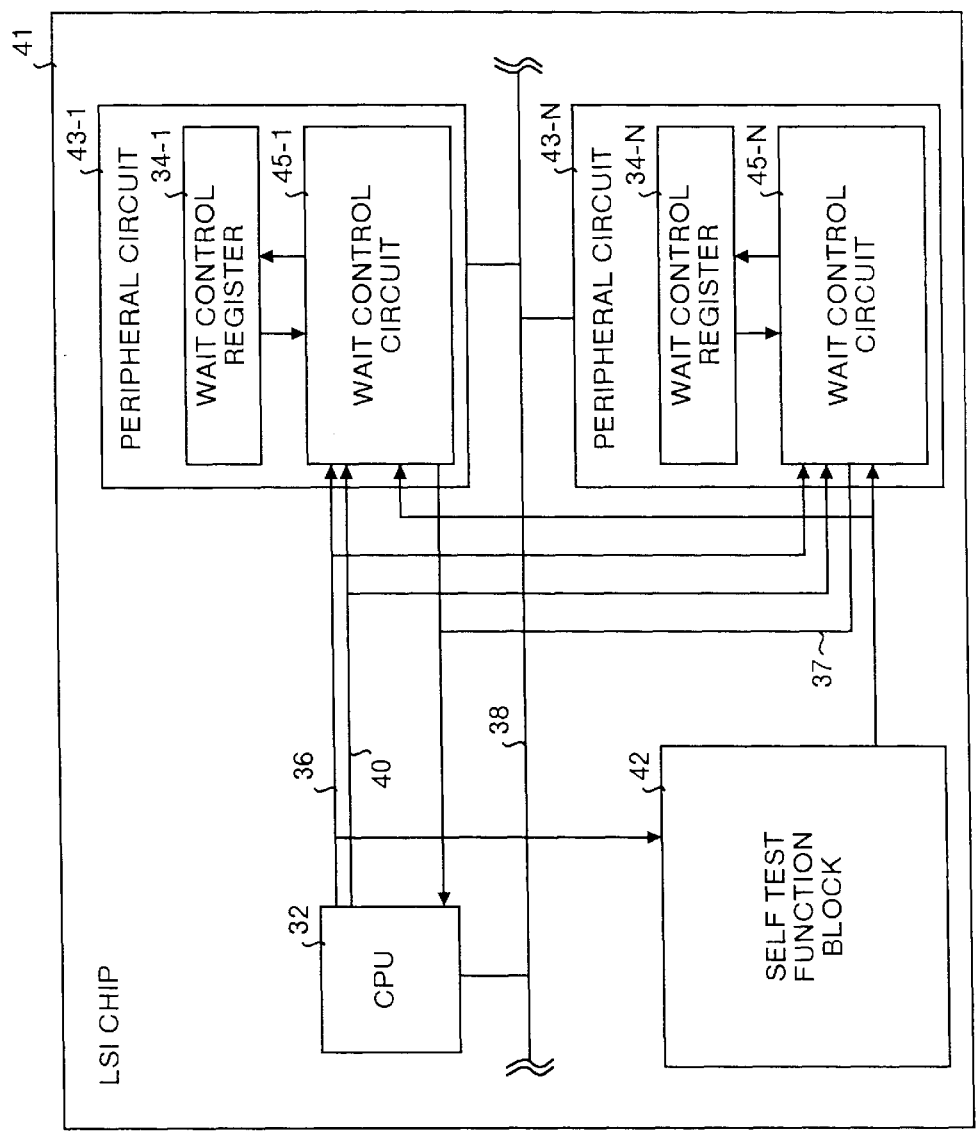
FIG. 6 is a diagram showing a schematic configuration of a semiconductor device according to a fifth embodiment of the invention.

A fifth embodiment of the invention is similar to the fourth embodiment except that the test for detecting data related to the number of wait cycles necessary for an access, which is conducted by using the test register is changed to a test which is conducted by using a delay circuit. FIG. 6 is a diagram showing a schematic configuration of an LSI chip according to the fifth embodiment of the present invention. The same components as those of the fourth embodiment are designated by the same legends as those of FIG. 4.

The LSI chip 41 of the fifth embodiment is similar to the LSI chip 31 in the fourth embodiment except that a self test function block 42 for conducting a test by using a delay circuit is provided in place of the self function block 39, and wait control circuits 45-1 to 45-N for determining information of the number of wait cycles based on a test result of the self test function block 42 are provided in place of the wait control circuits 35-1 to 35-N. Each of peripheral circuits 43-1 to 43-N is different from each of the peripheral circuits 33-1 to 33-N of the fourth embodiment with respect to the configuration of the wait control circuit.

Figure 7:
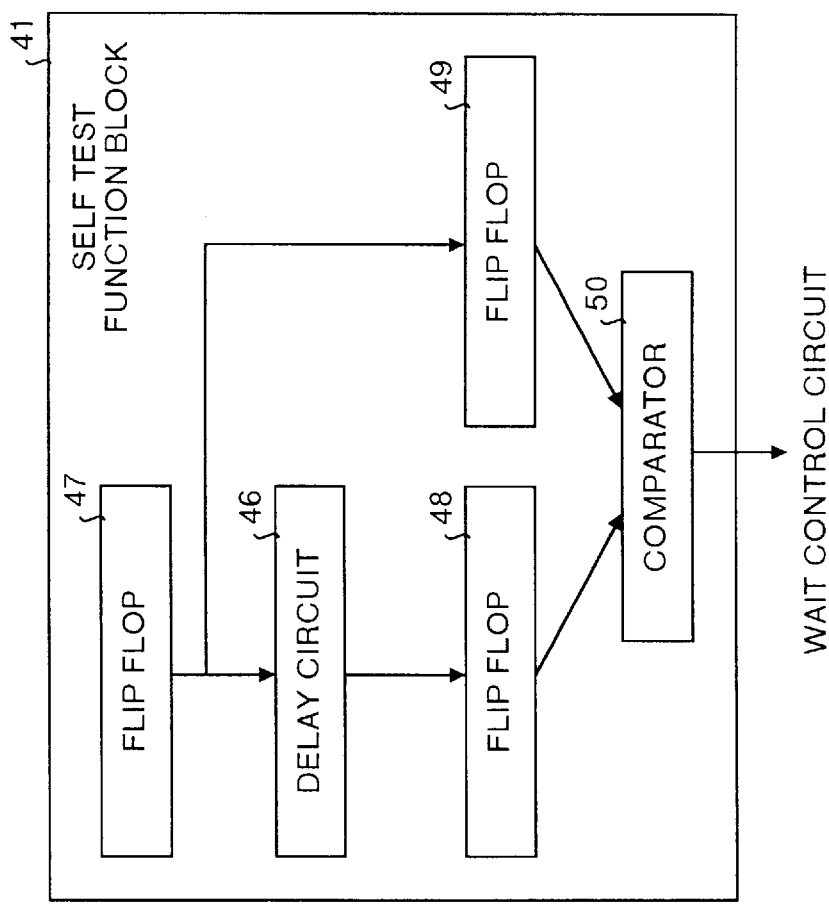
FIG. 7 is a diagram showing a schematic configuration of a self test function block illustrated in FIG. 6.

FIG. 7 is a diagram showing a schematic configuration of the self test function block 42 illustrated in FIG. 6. The self test function block 42 includes a flip flop 47 for outputting a step signal which rises from the low level to the high level (or falls from the high level to the low level) when a bus request signal is outputted from the CPU 32. A delay circuit 46 receives the step signal outputted from the flip flop 47, delays the signal, and outputs the delayed signal. A flip flop 48 receives the signal outputted from the delay circuit 46 and outputs the signal. A flip flop 49 receives the step signal outputted from the flip flop 47 and outputs the signal. A comparator 50 receives the signals outputted from the flip flops 48 and 49, compares the signals, and outputs the comparison result to the wait control circuits 45-1 to 45-N.

The delay circuit 46 is constructed by, for example, an inverter chain, delays the step signal outputted form the flip flop 47 and outputs the delayed signal to the flip flop 48. The flip flops 47 to 49 synchronously operate at the operation frequency of the LSI chip 41. The comparator 50 receives the output signal of the flip flop 48 and the output signal of the flip flop 49, compares the signals, and outputs either a high-level signal when the signals coincide with each other or a low-level signal when the signals do not coincide with each other to the wait control circuits 45-1 to 45-N.

Each of the wait control circuits 45-1 to 45-N receives the signal from the comparator 50, which indicates the result of the test of the self test function block 42, and outputs a bus completion signal to the CPU 32 when the signal goes high. The wait control circuits 45-1 to 45-N correspond to the control unit, and the self test function block 42 corresponds to the testing unit of the invention.

An operation of the fifth embodiment is explained here. When a bus request signal is outputted from the CPU 32, the flip flop 47 in the self test function block 42 drives the output signal high. When the output signal of the flip flop 47 goes high, the flip flop 49 drives its output signal high synchronously with the rising edge of the next operation clock signal. On the other hand, the flip flop 48 drives its output signal high synchronously with the rising edge of an operation clock signal generated after elapse of delay time by the delay circuit 46 since the output signal of the flip flop 47 went high.

The delay time of the delay circuit 46 is preset to coincide with the response time of each of the peripheral circuits 43-1 to 43-N. The delay time of the delay circuit 46 changes as the power supply voltage of the LSI chip 41 or the temperature changes as well as the response time of the peripheral circuits 43-1 to 43-N. Since the delay time of the delay circuit 46 changes according to the performance characteristics of the LSI chip 41, by detecting the delay time of the delay circuit 46, the performance characteristics of the LSI chip 41 can be detected. Further, in accordance with variations in gate size and in dose of charges which occur during the LSI manufacturing process, the delay time of the delay circuit 46 changes. Consequently, if variations in gate size and variations in dose of charges occur as well, the performance characteristics of the LSI chip 41 can be detected.

For example, when the delay time of the delay circuit 46 is shorter than the operation cycle, the output signal of the flip flop 48 and the output signal of the flip flop 49 rise simultaneously, and the comparator 50 outputs the high level signal to the wait control circuits 45-1 to 45-N. On the other hand, when the delay time of the delay circuit 46 is longer than the operation cycle, only the output signal of the flip flop 49 goes high, and the comparator 50 outputs the low-level signal to the wait control circuits 45-1 to 45-N. When the output signal of the flip flop 48 goes high synchronously with the rising edge of the operation clock signal after elapse of the delay time, the comparator 50 outputs the high-level signal to the wait control circuits 45-1 to 45-N.

Consequently, the wait control circuits 45-1 to 45-N can obtain the information of the delay time (the number of clock cycles) by the delay circuit 46. When the signal from the comparator 50 goes high, the wait control circuit to be accessed outputs a bus completion signal to the CPU 32. Alternately, the following manner is also possible. In accordance with a program recorded on a ROM (not shown), the CPU 32 or a test control device (not shown) controls the self test function block 42 to conduct a test and the information of the number of wait cycles according to the test result is written into the wait control registers 34-1 to 34-N. In this case, the wait control circuits 45-1 to 45-N perform the same operation as that of the wait control circuits 35-1 to 35-N of the fourth embodiment.

As described above, according to the fifth embodiment, the self test function block 42 detects the delay time (the number of clock cycles) by the delay circuit 46 as a test result. Since the number of wait cycles of the access by the CPU 32 to the peripheral circuits 43-1 to 43-N can be changed to a proper value, even if the power supply voltage of the LSI chip 41, the operation frequency of the LSI chip 41, or the temperature changes, the access can be made efficiently, the semiconductor device properly operates, and the processing capabilities can be improved.

Figure 8:
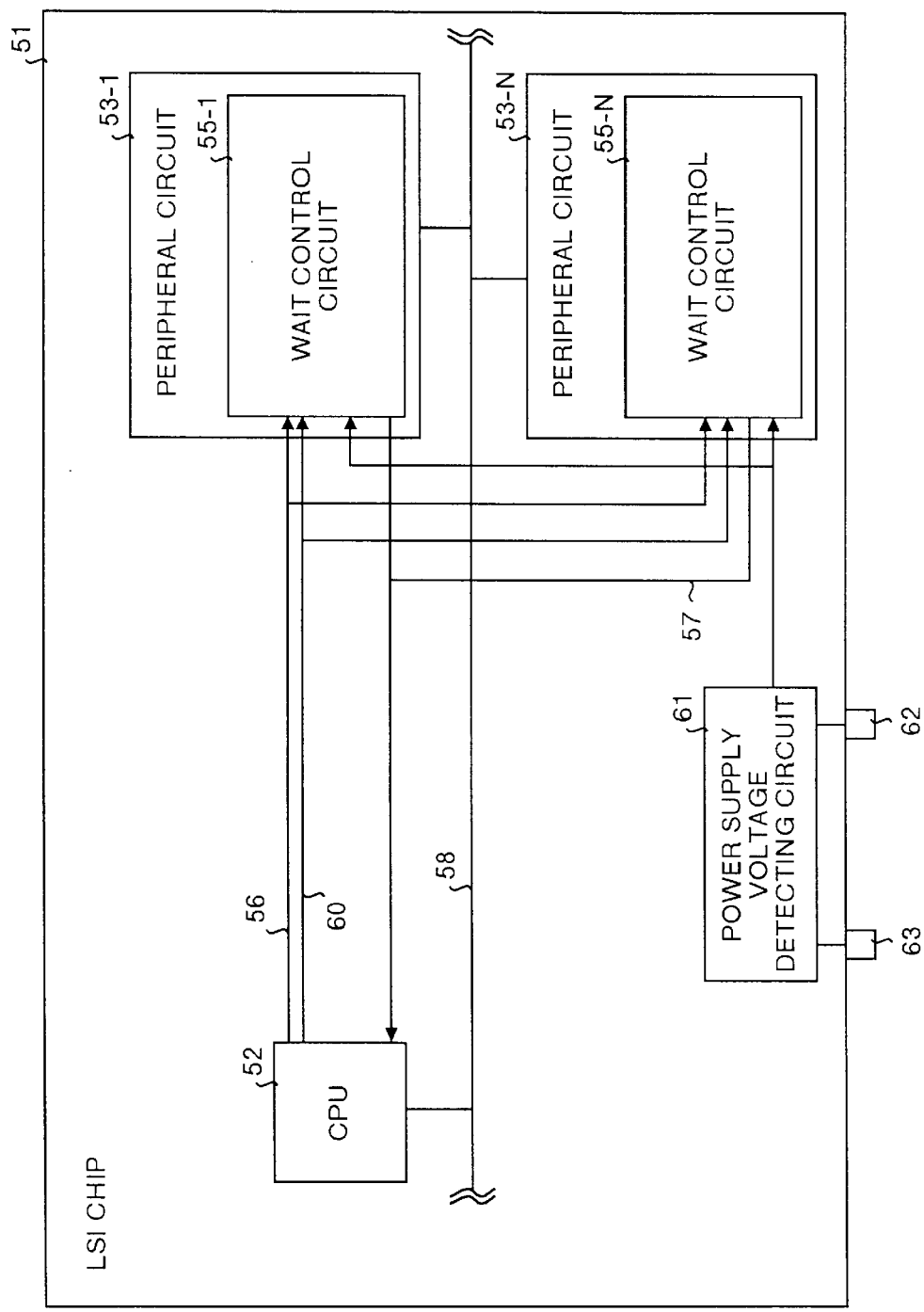
FIG. 8 is a diagram showing a schematic configuration of a semiconductor device according to a sixth embodiment of the invention.

FIG. 8 is a diagram showing a schematic configuration of an LSI chip according to a sixth embodiment of the present invention. The LSI chip 51 has a CPU 52, and peripheral circuits 53-1 to 53-N accessed by the CPU 52. A bus request signal line 56 transmits a bus request signal requesting an access by the CPU 52 to the peripheral circuits 53-1 to 53-N. A bus completion signal line 57 transmits a bus completion signal notifying of an end of an accessing process. An internal address/data bus 58 connects the CPU 52 and the peripheral circuits 53-1 to 53-N. A read/write signal line 60 transmits a read/write signal indicating whether an access being made is a reading access or a writing access. A power supply voltage detecting circuit 61 detects a power supply voltage of the LSI chip 51.

The CPU 52 transmits the bus request signal to the wait control circuits 55-1 to 55-N. In case of reading access, the read/write signal is driven to the high level and is transmitted to the wait control circuits 55-1 to 55-N. In case of writing access, the read/write signal is driven to the low level and is transmitted to the wait control circuits 55-1 to 55-N. The CPU 52 accesses the peripheral circuits 53-1 to 53-N via the internal address/data bus 58.

The peripheral circuits 53-1 to 53-N may be any circuits such as a memory, memory controller, timer, or serial I/O. These peripheral circuits 53-1 to 53-N are mounted on the LSI chip 51 together with the CPU 52. The number of the peripheral circuits 53-1 to 53-N is not especially limited. There may be only one peripheral circuit. Each peripheral circuit has wait control circuits 55-1 to 55-N for performing a wait control of the access by the CPU 52 to the peripheral circuits 53-1 to 53-N. The power supply voltage detecting circuit 61 compares a power supply voltage supplied via a power supply terminal 62 with a voltage determining reference voltage for determining a power supply voltage value supplied via a voltage determining reference voltage input terminal 63, thereby detecting the power supply voltage value. The power supply voltage may be detected only from the power supply voltage without using the voltage determining reference voltage.

The power supply voltage detecting circuit 61 generates a signal indicative of a detection result in such a manner that a high-level signal is outputted when the detection result is higher than a predetermined value, and a low-level signal is outputted when the detection result is lower than the predetermined value. The power supply voltage detecting circuit 61 outputs the generated signal to each of the wait control circuits 55-1 to 55-N. Each of the wait control circuits 55-1 to 55-N determines the number of wait cycles for reading and the number of wait cycles for writing based on the detection result of the power supply voltage detecting circuit 61 and performs a wait control of the access by the CPU 52 to the peripheral circuits 53-1 to 53-N. For example, when the signal indicative of the detection result from the power supply voltage detecting circuit 61 is at the high level, the number of wait cycles is set to one. When the signal indicative of the detection result from the power supply voltage detecting circuit 61 is at the low level, the number of wait cycles is set to two.

Alternately, the following manner is also possible. Each of the peripheral circuits 53-1 to 53-N is provided with a wait control register, and the wait control register holds information of the number of wait cycles according to the detection result of the power supply voltage detecting circuit 61. In this case, each of the wait control circuits 55-1 to 55-N performs a wait control based on the information of the number of wait cycles held by each of the wait control registers. Although it is explained that a separate wait control register is provided in each peripheral circuit, one wait control register may be shared by all or many peripheral circuits. Similarly, one wait control circuit may be shared by all or many peripheral circuits. The wait control circuits 55-1 to 55-N correspond to the control unit of the invention.

An operation of the sixth embodiment will be explained now. The power supply voltage detecting circuit 61 detects the power supply voltage and outputs a signal indicative of the detection result to the wait control circuits 55-1 to 55-N. Each of the wait control circuits 55-1 to 55-N which have received the signal determines the number of wait cycles for reading and the number of wait cycles for writing.

An operation of accessing the peripheral circuits 53-1 to 53-N by the CPU 52 will now be described. For example, when the CPU 52 accesses the peripheral circuit 53-1, the CPU 52 transmits a bus request signal and a read/write signal to the peripheral circuits 53-1 to 53-N, thereby starting the access. Subsequently, the CPU 52 outputs address data to the internal address/data bus 58. In case of reading access, the CPU 52 prepares to capture data. In case of writing access, write data is outputted.

Each of the peripheral circuits 53-1 to 53-N receives the bus request signal, the read/write signal, and the address data. When the peripheral circuit 53-1 to be accessed operates and the read/write signal is at the high level, that is, in case of reading access, read data is outputted to the internal address/data bus 58. In the case where the read/write signal is at the low level, that is, in case of writing access, write data is captured from the internal address/data bus 58.

The wait control circuit 55-1 in the peripheral circuit 53-1 has a counter (not shown). On receipt of the bus request signal and the read/write signal, the wait control circuit 55-1 determines whether the read/write signal is at the high level or the low level. When the read/write signal is at the high level, it is determined as the reading access and information of the number of wait cycles for reading is determined based on the detection result of the power supply voltage detecting circuit 61. On the other hand, When the read/write signal is at the low level, it is determined as a writing access, and information of the number of the wait cycles for writing is determined based on the detection result of the power supply voltage detecting circuit 61.

Clock cycles of the number corresponding to the number of wait cycles are counted and, after the counting, a bus completion signal is transmitted to the CPU 52. In case of reading access, the CPU 52 which has received the bus completion signal captures data from the internal address/data bus 58, recognizes completion of the access, and shifts to the next access. On the other hand, in case of writing access, the CPU 52 which has received the bus completion signal recognizes the completion of the access and shifts to the next access.

As described above, according to the sixth embodiment, the power supply voltage detecting circuit 61 detects the power supply voltage of the LSI chip 51. Each of the wait control circuits 55-1 to 55-N determines the number of wait cycles of an access by the CPU 52 to each of the peripheral circuits 53-1 to 53-N based on the detection result of the power supply voltage detecting circuit 61, and performs the wait control of the access. Consequently, the number of wait cycles of the access by the CPU 52 to the peripheral circuits 53-1 to 53-N can be changed according to the power supply voltage of the LSI chip 51. Thus, the semiconductor device properly operates and the processing capabilities can be improved.

Figure 9:
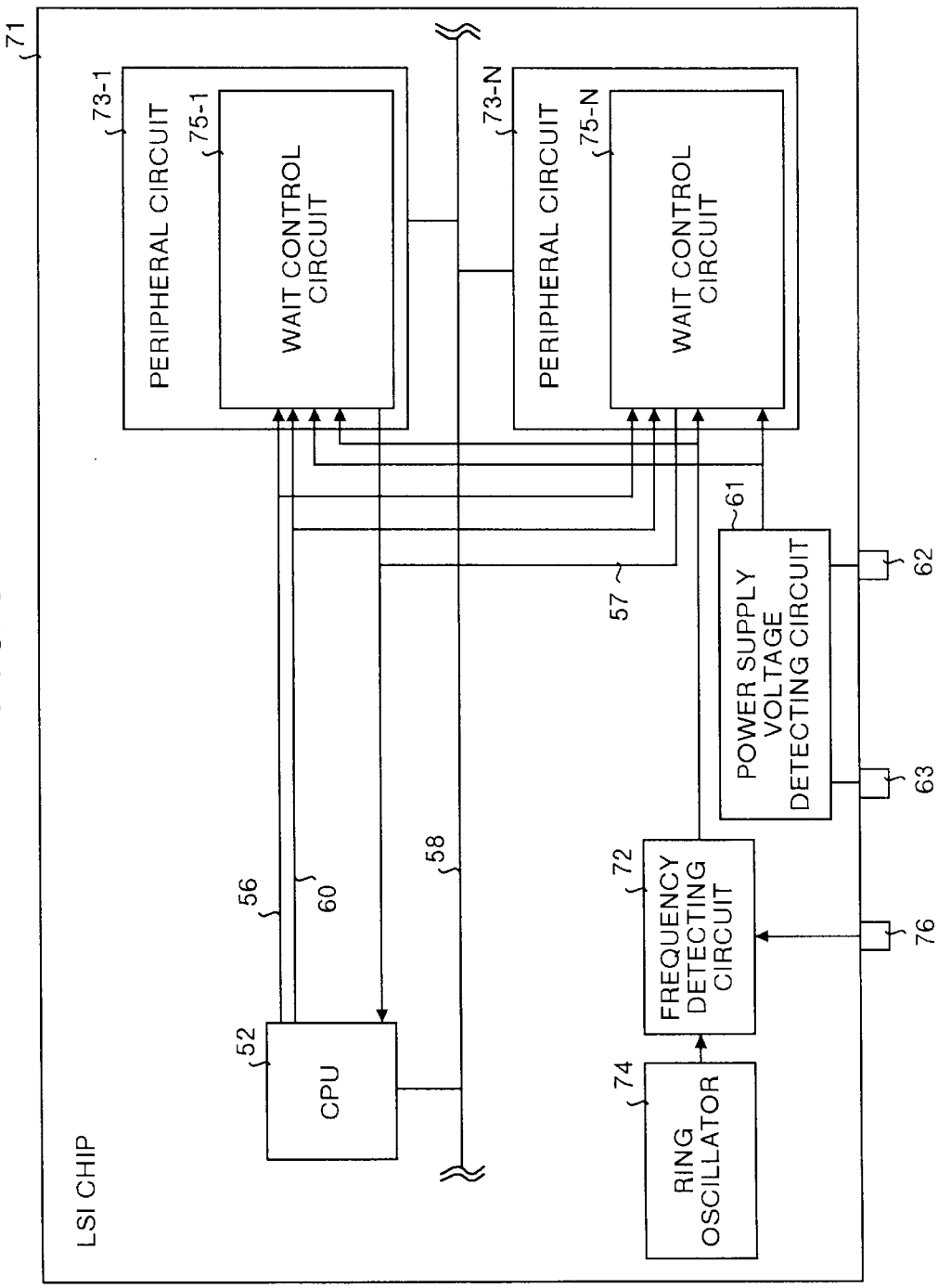
FIG. 9 is a diagram showing a schematic configuration of a semiconductor device according to a seventh embodiment of the invention.

A seventh embodiment of the invention is similar to the sixth embodiment. However, in the seventh embodiment, the operation frequency of the LSI chip is detected and the number of wait cycles of an access is determined based on both the operation frequency and the power supply voltage. FIG. 9 is a diagram showing a schematic configuration of an LSI chip according to the seventh embodiment of the present invention. The same components as those of the sixth embodiment are designated by the same legends as those of FIG. 8.

The LSI chip 71 is obtained by adding in the LSI chip 51 of the sixth embodiment a ring oscillator 74 for generating a clock signal for comparison used to detect the operation frequency of the LSI chip 71, and a frequency detecting circuit 72 for detecting the operation frequency (frequency of the operation clock signal) by comparing the comparison clock signal generated by the ring oscillator 74 with a reference clock signal (operation clock signal) which operates the LSI chip 71. The LSI chip 71 of the seventh embodiment has, in place of the wait control circuits 55-1 to 55-N of the sixth embodiment, wait control circuits 75-1 to 75-N each for determining the number of wait cycles for reading and the number of wait cycles for writing based on the detection result of the frequency detecting circuit 72 and the detection result of the power supply voltage detecting circuit 61.

Thus, the configuration of the wait control circuit in the peripheral circuits of the seventh embodiment and that in the sixth embodiment is different. In addition to the reference clock signal, other clock signals for operating the LSI chip 71 may be supplied to the LSI chip 71 from the outside. The ring oscillator 74 generates a clock signal for comparison. The frequency detecting circuit 72 detects the operation frequency of the LSI chip 71 by counting the number of comparison clock signals in a period corresponding to predetermined cycles of the operation clock signals of the LSI chip 71. The frequency detecting circuit 72 generates a signal indicative of the detection result in such a manner that a high-level signal is generated when the detection result is higher than a predetermined value and a low-level signal is generated when the detection result is lower than the predetermined value. The frequency detecting circuit 72 outputs the generated signal to each of the wait control circuits 75-1 to 75-N.

Each of the wait control circuits 75-1 to 75-N determines the number of wait cycles for reading and the number of wait cycles for writing based on the detection result of the frequency detecting circuit 72 and the detection result of the power supply voltage detecting circuit 61 and performs a wait control of an access by the CPU 52 to the peripheral circuits 73-1 to 73-N. For example, when the signal indicative of the detection result from the power supply voltage detecting circuit 61 is at the high level and the signal indicative of the detection result from the frequency detecting circuit 72 is at the low level, the number of wait cycles is set to one. When the signal indicative of the detection result from the power supply voltage detecting circuit 61 is at the low level and the signal indicative of the detection result from the frequency detecting circuit 72 is at the high level, the number of wait cycles is set to three.

Alternately, the following manner is also possible. Each of the peripheral circuits 73-1 to 73-N is provided with a wait control register, and the wait control register holds information of the number of wait cycles according to the detection results of the power supply voltage detecting circuit 61 and the frequency detecting circuit 72. In this case, each of the wait control circuits 75-1 to 75-N performs a wait control based on the information of the number of wait cycles held by each of the wait control registers.

Although it is explained that a separate wait control register is provided in each peripheral circuit, one wait control register may be shared by all or many peripheral circuits. Similarly, one wait control circuit may be shared by all or many peripheral circuits. The wait control circuits 75-1 to 75-N correspond to the control unit of the invention. The ring oscillator 74 corresponds to the comparison clock generating unit of the invention. The frequency detecting circuit 72 corresponds to the operation clock detecting unit of the invention.

An operation of the seventh embodiment will be explained now. The frequency detecting circuit 72 detects the operation frequency, the power supply voltage detecting circuit 61 detects the power supply voltage, and each of the wait control circuits 75-1 to 75-N determines the number of wait cycles for reading and the number of wait cycles for writing. The other operation is similar to those of the sixth embodiment.

As described above, according to the seventh embodiment, the frequency detecting circuit 72 detects the operation frequency of the LSI chip 71, and each of the wait control circuits 75-1 to 75-N determines the number of wait cycles of the access by the CPU 52 to each of the peripheral circuits 73-1 to 73-N based on the detection result of the frequency detecting circuit 72, and performs the wait control of the access. Consequently, the number of wait cycles of the access by the CPU 52 to the peripheral circuits 73-1 to 73-N can be therefore changed according to the operation frequency of the LSI chip 71. Thus, the semiconductor device operates properly and the processing capabilities can be improved.

FIG. 10 is a diagram showing a schematic configuration of an LSI chip according to an eighth embodiment of the present invention. The LSI chip 81 has a CPU 82, and peripheral circuits 83-1 to 83-N accessed by the CPU 82. A bus request signal line 86 transmits a bus request signal requesting an access by the CPU 82 to the peripheral circuits 83-1 to 83-N. A bus completion signal line 87 transmits a bus completion signal notifying of an end of an accessing process. An internal address/data bus 88 connects the CPU 82 and the peripheral circuits 83-1 to 83-N. A read/write signal line 90 transmits a read/write signal indicating whether an access being made is a reading access or a writing access. A clock controller 91 generates an operation clock signal for the peripheral circuits 83-1 to 83-N.

The clock controller 91 includes a clock selection register 92 for switchably holding information of a frequency dividing number of the operation clock signal for the peripheral circuits 83-1 to 83-N, and a clock selecting circuit 93 for dividing the frequency of the operation clock signal of the LSI chip 81 based on the information of the frequency dividing number held in the clock selecting register 92 to thereby generate the operation clock signal for the peripheral circuits 83-1 to 83-N, and supplying the generated signal to the peripheral circuits 83-1 to 83-N. The information of the frequency dividing number held by the clock selecting register 92 is switched by, for example, a writing operation from the CPU 82. The frequency dividing number of the clock selecting register 92 is selected from a plurality of values such as 1, ½, and ¼.

The peripheral circuits 83-1 to 83-N may be any circuits such as a memory, memory controller, timer, or serial I/O. These peripheral circuits 83-1 to 83-N are mounted on the LSI chip 81 together with the CPU 82. The number of the peripheral circuits 83-1 to 83-N is not especially limited. There may be only one peripheral circuit. Each peripheral circuit has wait control circuits 85-1 to 85-N for performing the wait control of an access by the CPU 82 to the peripheral circuits 83-1 to 83-N based on the information of the frequency dividing number held by the clock selecting register 92. Each of the wait control circuits 85-1 to 85-N determines the number of wait cycles for reading and the number of wait cycles for writing based on the information of the frequency dividing number held by the clock selecting register 92, and performs the wait control of the access by the CPU 82 to the peripheral circuits 83-1 to 83-N.

The clock selecting circuit 93 divides the frequency of the operation clock signal of the LSI chip 81 based on the information of the frequency dividing number held by the clock selecting register 92 to thereby generate the operation clock signal for the peripheral circuits 83-1 to 83-N, and supplies the generated signal to the peripheral circuits 83-1 to 83-N. The CPU 82 transmits the bus request signal to the wait control circuits 85-1 to 85-N. In case of reading access, the CPU 82 drives the read/write signal to the high level and transmits the resultant signal to the wait control circuits 85-1 to 85-N. In case of writing access, the CPU 82 drives the read/write signal to the low level and transmits the resultant signal to the wait control circuits 85-1 to 85-N. The CPU 82 accesses the peripheral circuits 83-1 to 83-N via the internal address/data bus 88.

At the time of the reading access, each of the wait control circuits 85-1 to 85-N counts the waiting time of an access based on the information of the number of wait cycles for reading determined based on the operation frequency for the peripheral circuits 83-1 to 83-N and transmits a bus completion signal to the CPU 82. In case of writing access, each of the wait control circuits 85-1 to 85-N counts the waiting time of an access based on the information of the number of wait cycles determined based on the operation frequency for the peripheral circuits 83-1 to 83-N and transmits a bus completion signal to the CPU 82.

Alternately, the following manner is also possible. Each of the peripheral circuits 83-1 to 83-N is provided with a wait control register, and the wait control register holds information of the number of wait cycles according to the information of the frequency dividing number of the clock selecting register. In this case, each of the wait control circuits 85-1 to 85-N performs a wait control based on the information of the number of wait cycles held by each of the wait control registers. Although the example in which the peripheral circuits 83-1 to 83-N are provided with the wait control circuits 85-1 to 85-N, respectively, has been described above, a single wait control circuit may be provided so as to be shared by the peripheral circuits 83-1 to 83-N. The wait control circuits 85-1 to 85-N correspond to the control unit, the clock controller 91 corresponds to the unit for generating an operation clock for a peripheral circuit of the present invention.

An operation of the eighth embodiment will be explained now. The clock controller 91 generates the operation clock signal for the peripheral circuits 83-1 to 83-N and transmits the information of the frequency dividing number indicative of the operation frequency for the peripheral circuits 83-1 to 83-N to the peripheral circuits 83-1 to 83-N. An operation of accessing the peripheral circuits 83-1 to 83-N by the CPU 82 will now be described. For example, when the CPU 82 accesses the peripheral circuit 83-1, the CPU 82 transmits the bus request signal and the read/write signal to the peripheral circuits 83-1 to 83-N, thereby starting the access. Subsequently, the CPU 82 outputs address data to the internal address/data bus 88. In case of reading access, the CPU 82 prepares to capture data. In case of writing access, the CPU 82 outputs write data.

Each of the peripheral circuits 83-1 to 83-N receives the bus request signal, the read/write signal, and the address data. When the peripheral circuit 83-1 to be accessed operates and the read/write signal is at the high level, that is, at the time of the reading access, the read data is outputted to the internal address/data bus 88. When the read/write signal is at the low level, that is, in case of writing access, write data is captured from the internal address/data bus 88.

The wait control circuit 85-1 in the peripheral circuit 83-1 has a counter (not shown). On receipt of the bus request signal and the read/write signal, the wait control circuit 85-1 determines whether the read/write signal is at the high level or the low level. When the read/write signal is at the high level, it is determined as the reading access and information of the number of wait cycles for reading is determined based on the information of the frequency dividing number of the clock controller 91. On the other hand, when the read/write signal is at the low level, it is determined as a writing access, and information of the number of the wait cycles for writing is determined based on the information of the frequency dividing number of the clock controller 91. The information of the number of wait cycles is determined in such a manner that, when the frequency dividing number is ½, the number of wait cycles is "1", and when the frequency dividing number is ¼, the number of wait cycles is "3".

Clock cycles of the number corresponding to the number of wait cycles are counted and, after the counting, a bus completion signal is transmitted to the CPU 82. In case of reading access, the CPU 82 which has received the bus completion signal captures data from the internal address/data bus 88, recognizes completion of the access, and shifts to the next access. On the other hand, in case of writing access, the CPU 82 which has received the bus completion signal recognizes the completion of the access and shifts to the next access.

As described above, according to the eighth embodiment, the clock controller 91 generates the operation clock signal for the peripheral circuit for operating the peripheral circuits 83-1 to 83-N, and each of the wait control circuits 85-1 to 85-N determines the number of wait cycles of an access by the CPU 82 to the peripheral circuits 83-1 to 83-N based on the frequency of the operation clock signal for the peripheral circuit generated by the clock controller 91, and performs the wait control of the access. Consequently, since the number of wait cycles of the access by the CPU 82 to the peripheral circuits 83-1 to 83-N can be changed in accordance with the operation frequency for peripheral circuits, the semiconductor device operates properly and the processing capabilities can be improved.

Further, the holding unit changeably holds the information of the number of wait cycles, and the control unit performs the wait control of the access based on the information of the number of wait cycles. Consequently, since the number of wait cycles of the access by the CPU to the peripheral circuit can be changed, effects such that the semiconductor device operates properly and the processing capabilities can be improved are produced.

Further, the holding unit holds the information of the number of wait cycles of each of the peripheral circuits. The information of the number of wait cycles can be therefore changed every peripheral circuit. Consequently, an effect such that the processing capabilities can be further improved is produced.

According to the invention, the holding unit changeably holds the information of the number of wait cycles for writing and the information of the number of wait cycles for reading. The control unit performs a wait control of the writing access based on the information of the number of wait cycles for writing and performs a wait control of the reading access based on the information of the number of wait cycles for reading. Consequently, the wait control of the writing access and that of the reading access can be separately performed. Thus, an effect such that the processing capabilities can be further improved is produced.

According to the invention, input connection unit for supplying a designation signal for designating the number of wait cycles of an access by a CPU to a peripheral circuit into the semiconductor device from the outside of the semiconductor device. The control unit performs the wait control of the access based on the designation signal supplied via the input connection unit. Consequently, the number of wait cycles of the access by the CPU to the peripheral circuit can be changed. Thus, an effect such that the semiconductor device operates properly and the processing capabilities can be improved is produced.

Further, the testing unit conducts a test for detecting data regarding the number of wait cycles necessary for an access. The control unit determines the number of wait cycles of the access by the CPU to the peripheral circuit based on the test result of the testing unit and performs the wait control of the access. Consequently, the number of wait cycles of the access by the CPU to the peripheral circuit can be changed to a proper value. Thus, an effect such that the semiconductor device operates properly and the processing capabilities can be improved is produced.

Further, the testing unit accesses the unit to be accessed having response time equivalent to that of the peripheral circuit, determines whether the access has succeeded or not, and obtains the number of wait cycles necessary for the access to the unit to be accessed as a test result. Consequently, the number of wait cycles of the access by the CPU to the peripheral circuit can be changed to a proper value. Thus, an effect such that the semiconductor device operates properly and the processing capabilities can be improved is produced.

According to the invention, the testing unit detects the delay time by the delay unit having the delay time equivalent to the response time of the peripheral circuit as a test result. Since the number of wait cycles of the access by the CPU to the peripheral circuit can be changed to a proper value, an effect such that the semiconductor device operates properly and the processing capabilities can be improved is produced.

According to the invention, the power supply voltage detecting unit detects the power supply voltage of the semiconductor device, and the control unit determines the number of wait cycles of the access by the CPU to the peripheral circuit based on the detection result of the power supply voltage detecting unit and performs the wait control of the access. The number of wait cycles of the access by the CPU to the peripheral circuit can be therefore changed according to the power supply voltage of the semiconductor device. An effect such that the semiconductor device operates properly and the processing capabilities can be improved is produced.

According to the invention, the operation clock detecting unit detects the frequency of the operation clock signal (operation frequency) for operating the semiconductor device, and the control unit determines the number of wait cycles of the access by the CPU to the peripheral circuit based on the detection result of the operation clock detecting unit and performs the wait control of the access. The number of wait cycles of the access by the CPU to the peripheral circuit can be therefore changed according to the operation frequency of the semiconductor device. Thus, an effect such that the semiconductor device operates properly and the processing capabilities can be improved is produced.

Further, the operation clock detecting unit has comparison clock generating unit for generating a clock signal for comparison of a predetermined frequency, and detects the frequency of the operation clock signal by comparing the comparison clock signal and the operation clock signal with each other. Thus, an effect such that the operation frequency of the semiconductor device can be detected is produced.

According to the invention, the unit for generating an operation clock for a peripheral circuit generates an operation clock signal for a peripheral circuit to operate a peripheral circuit. The control unit determines the number of wait cycles of an access by the CPU to the peripheral circuit based on the frequency of the operation clock signal for the peripheral circuit generated by the unit for generating the operation clock signal for the peripheral circuit, and performs the wait control of the access. Consequently, the number of wait cycles of the access by the CPU to the peripheral circuit can be changed according to the operation frequency for the peripheral circuit. Thus, an effect such that the semiconductor device operates properly and the processing capabilities can be improved is produced.

According to the invention, the number of wait cycles of an access by the CPU to a peripheral circuit is changed based on the frequency of the operation clock signal for operating a semiconductor device, the power supply voltage of the semiconductor device, and/or the frequency of the operation clock signal for a peripheral circuit. Consequently, the number of wait cycles of the access by the CPU to the peripheral circuit can be changed to a proper value in accordance with the operation frequency of the semiconductor device, the power supply voltage of the semiconductor device and/or the operation frequency for the peripheral circuit. Thus, an effect such that the semiconductor device operates properly and the processing capabilities can be improved is produced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A semiconductor device having therein a CPU and at least one peripheral circuit accessed by said CPU, said semiconductor device comprising:

a holding unit changeably holding information of number of wait cycles; and a control unit performing wait control for said at least one peripheral circuit so that said at least one peripheral circuit responds to said CPU based on the information of number of wait cycles.

2. The semiconductor device according to claim 1, including a plurality of peripheral circuits, wherein said holding unit holds the information of number of wait cycles of each for said peripheral circuits.

3. The semiconductor device according to claim 1, wherein the information of number of wait cycles includes wait cycle number information for writing indicative of the number of wait cycles for a writing access by said CPU to said at least one peripheral circuit, and wait cycle number information for reading indicative of the number of wait cycles for a reading access by said CPU to said at least one peripheral circuit, and said control unit controls waiting for the writing access based on the wait cycle number information for writing and controls waiting for the reading access based on the wait cycle number information for reading.

4. A semiconductor device having therein a CPU and at least one peripheral circuit accessed by said CPU, said semiconductor device comprising:

an input connection unit receiving, from outside of said semiconductor device, a designation signal designating number of wait cycles; and a control unit performing wait control for said at least one peripheral circuit so that said at least one peripheral circuit responds to said CPU based on the designation signal received via said input connection unit.

5. A semiconductor device having therein a CPU and at least one peripheral circuit accessed by said CPU, said semiconductor device comprising:

a testing unit conducting a test for detecting data regarding number of wait cycles necessary for an access; and a control unit determining number of wait cycles based on the test by said testing unit and performing wait control for said at least one peripheral circuit so that said at least one peripheral circuit responds to said CPU based on the number of wait cycles determined.

6. The semiconductor device according to claim 5, wherein said testing unit includes a unit to be accessed and having a response time equivalent to that of said at least one peripheral circuit; and said testing unit accesses said unit to be accessed, determines whether the access has succeeded, and obtains the number of wait cycles necessary for the access to said unit to be accessed as a test result.

7. The semiconductor device according to claim 5, wherein said testing unit includes a delay unit having delay time equivalent to response time of said at least one peripheral circuit, and said testing unit detects the delay time of said delay unit as a test result.

8. A semiconductor device having therein a CPU and at least one peripheral circuit accessed by said CPU, said semiconductor device comprising:

a power supply voltage detecting unit detecting a power supply voltage of said semiconductor device; and a control unit determining number of wait cycles based on the power supply voltage detected by said power supply voltage detecting unit, and performing wait control for said at least one peripheral circuit so that said at least one peripheral circuit responds to said CPU based on the number of wait cycles determined.

9. A semiconductor device having therein a CPU and at least one peripheral circuit accessed by said CPU, said semiconductor device comprising:

an operation clock detecting unit detecting frequency of an operation clock signal for operating said semiconductor device; and a control unit determining number of wait cycles based on a detection result of said operation clock detecting unit, and performing wait control for said at least one peripheral circuit so that said at least one peripheral circuit responds to said CPU based on the number of wait cycles determined.

10. The semiconductor device according to claim 9, wherein said operation clock detecting unit includes a comparison clock generating unit generating a clock signal for comparison to a predetermined frequency, and said operation clock detecting unit compares the comparison clock signal and the operate on clock signal with each other to detect the frequency of the operation clock signal.

11. A semiconductor device having therein a CPU and at least one peripheral circuit accessed by said CPU, said semiconductor device comprising:

an operation clock generation unit generating an operation clock for said at least one peripheral circuit, to operate said at least one peripheral circuit; and a control unit determining number of wait cycles based on frequency of the operation clock signal for the peripheral circuit generated by said operation clock generation unit and, wait control for said at least one peripheral circuit so that said at least one peripheral circuit responds to said CPU based on the number of wait cycles determined.

12. A computer readable medium for storing instructions, which, when executed by a computer, cause the computer to:

change the number of wait cycles of an for response to said CPU from said at least one peripheral circuit based on a) frequency of an operation clock signal for operating a semiconductor device having therein said CPU and said at least one peripheral circuit accessed by said CPU, and b) any one of a power supply voltage of said semiconductor device and a frequency of an operation clock signal for said at least one peripheral circuit.

* * * * *